US011057705B1

(12) United States Patent
Fong et al.

(10) Patent No.: US 11,057,705 B1
(45) Date of Patent: Jul. 6, 2021

(54) VALIDATION OF AUDIO-SEALING PATHWAY

(71) Applicant: PPIP LLC, Chandler, AZ (US)

(72) Inventors: Michael Fong, Chandler, AZ (US); Neric Hsin-wu Fong, Tempe, AZ (US); Teddy David Thomas, Bedford, NH (US)

(73) Assignee: PPIP, LLC, Chandler, AZ (US)

( * ) Notice: Subject to any disclaimer, the term of this patent is extended or adjusted under 35 U.S.C. 154(b) by 0 days.

(21) Appl. No.: 16/827,253

(22) Filed: Mar. 23, 2020

(51) Int. Cl.
*H04R 5/04* (2006.01)

(52) U.S. Cl.
CPC ..................... *H04R 5/04* (2013.01)

(58) Field of Classification Search
CPC ...... H04R 3/005; H04R 1/1083; H04R 29/00; H04R 29/001; H04R 5/04; H04R 3/04; H04R 3/12; H04R 1/288; H04R 1/025; H04R 2209/04; H04R 2209/08; G10L 15/22; G10L 21/0208; G10L 21/0232; G10L 21/0388; H04W 12/02; H04W 12/08; H04M 1/0202; H04M 1/035; G10K 11/175; G06F 1/182; G06F 21/60; G06F 7/588; H04L 9/0631; H04L 9/14; H04L 2209/04; H04L 2209/08
USPC ........ 381/73.1, 55, 122, 91, 95, 98, 99, 100, 381/101, 102, 103, 107; 455/575.8, 455/575.1; 700/94
See application file for complete search history.

(56) References Cited

U.S. PATENT DOCUMENTS

| | | | |
|---|---|---|---|
| 2011/0093262 A1* | 4/2011 | Wittke | G10K 11/17885 704/226 |
| 2014/0161273 A1* | 6/2014 | Soufan | H04K 3/43 381/73.1 |
| 2015/0030167 A1* | 1/2015 | Pan | H04R 29/001 381/59 |
| 2016/0098983 A1* | 4/2016 | Lehmann | G10K 11/175 455/575.1 |
| 2016/0234356 A1* | 8/2016 | Thomas | H05K 9/0069 |
| 2017/0180984 A1* | 6/2017 | Thomas | H04M 1/667 |
| 2017/0316773 A1* | 11/2017 | Walther | H04K 3/825 |
| 2018/0240450 A1* | 8/2018 | Moran, Jr. | H02J 7/0045 |
| 2018/0277086 A1* | 9/2018 | Soffer | G10K 11/175 |
| 2019/0141448 A1* | 5/2019 | Ozcan | H04R 29/001 |

* cited by examiner

*Primary Examiner* — Leshui Zhang
(74) *Attorney, Agent, or Firm* — Fernando & Partners, LLP

(57) ABSTRACT

A method includes generating, by a noise generator of an apparatus, a noise signal stream. The method includes outputting, via an audio output device of the apparatus, the noise signal stream towards an audio input device of a personal communication device. The noise signal stream travels from the audio output device towards the audio input device via an audio-sealing pathway. The method includes receiving a recorded representation of the noise signal stream from the personal communication device. The recorded representation of the noise signal stream is a function of a transformation of the noise signal stream, by the audio-sealing pathway, and characterizes an audio transfer function of the audio-sealing pathway. The method includes determining, by the controller of the apparatus, whether or not the audio-sealing pathway satisfies an operational criterion based on the recorded representation of the noise signal stream and a reference transfer function associated with the audio-sealing pathway.

20 Claims, 10 Drawing Sheets

VALIDATION OF AUDIO-SEALING PATHWAY

TECHNICAL FIELD

This relates generally to the field of privacy protection, and more specifically, validating an audio-sealing pathway of enclosed devices.

BACKGROUND

A smartphone has sensors that can be used for collecting information about a user or from the environment around a user. For example, microphones on a smartphone can be used to record a user's conversation. Often, a smartphone also has radios for local or remote communications, such as a cellular radio, a Wi-Fi radio, and/or a Bluetooth radio. Together, the sensors and radios can capture a wealth of user information, which could be maliciously provided to third parties. For example, utilizing the microphones and the communication devices on a smartphone, the third parties can eavesdrop from a remote location. Previously existing systems, methods, and devices are inadequate in controlling the signals along the signal propagation path. Consequently, when malicious third parties (e.g., hackers) gain unwanted access to a smartphone, the user may not be aware of the privacy invasion. Moreover, smartphones are not typically capable of masking information collected by the sensors, and unprotected user private information can be collected and disseminated. As such, smartphones are inadequate in providing user privacy protection.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
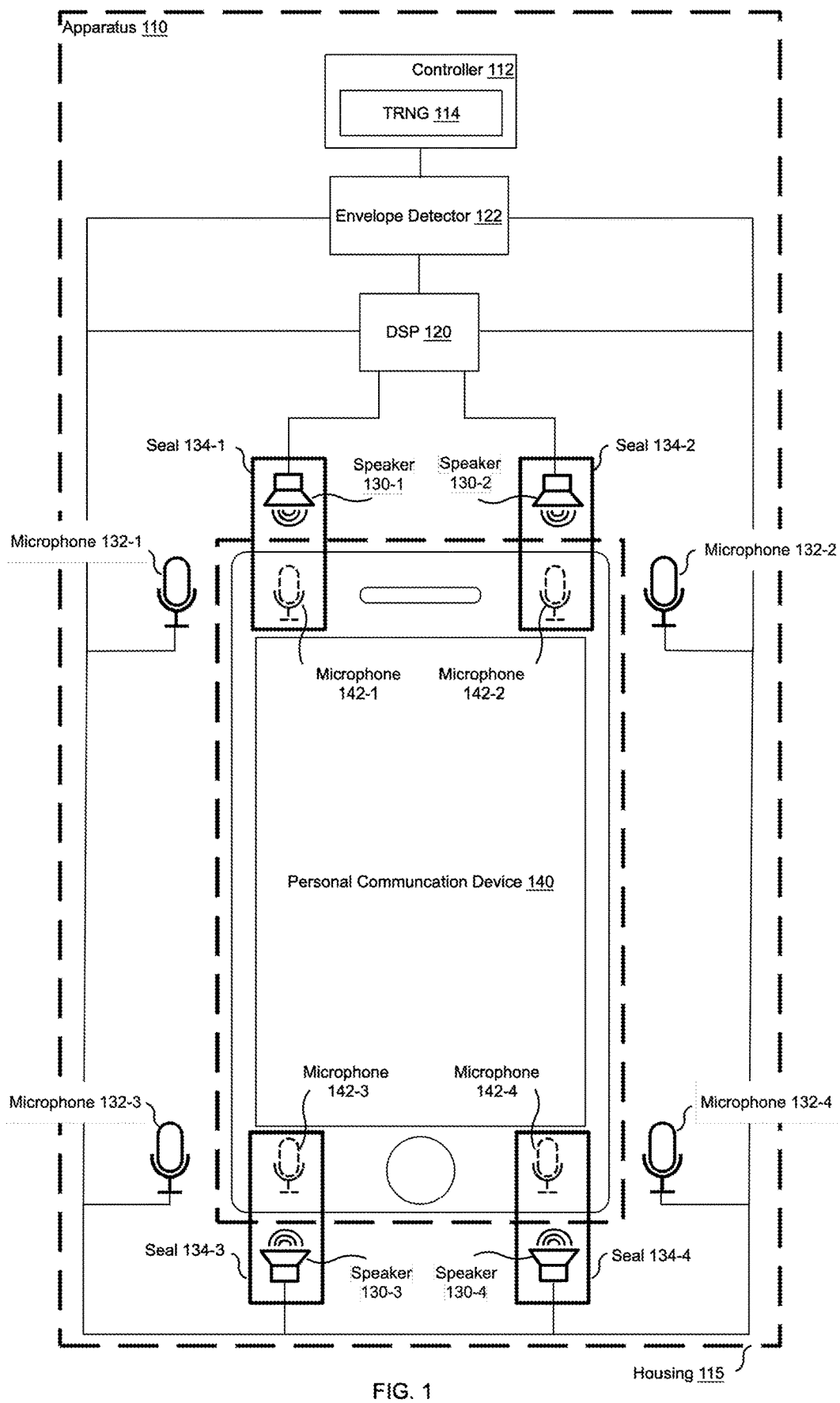
FIG. 1 is a block diagram of an example of an audio jamming apparatus in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein are methods, apparatuses, and personal communication devices for determining whether or not an audio-sealing pathway is operational. The audio-sealing pathway is between an audio output device of an apparatus and an audio input device of a personal communication device.

In some embodiments, a method includes generating, by a noise generator of an apparatus, a first noise signal stream. The apparatus includes a housing to receive a personal communication device. The housing includes a first audio-seal between a first audio output device of the apparatus and a corresponding first audio input device of the personal communication device. The method includes outputting, via the first audio output device, the first noise signal stream towards the corresponding first audio input device. The first noise signal stream travels from the first audio output device towards the corresponding first audio input device via a first audio-sealing pathway provided by a first audio-seal included in the apparatus. The method includes receiving a recorded representation of the first noise signal stream from the personal communication device. The recorded representation of the first noise signal stream is a function of a transformation of the first noise signal stream, by the first audio-sealing pathway. The transformation characterizes a first audio transfer function of the first audio-sealing pathway. The method includes determining, by the controller of the apparatus, whether or not the first audio-sealing pathway satisfies an operational criterion based on the recorded representation of the first noise signal stream and a reference transfer function associated with the first audio-sealing pathway.

In some embodiments, a method includes obtaining, at a first audio input device of a personal communication device, a first audio input signal that is based on a first noise signal stream output from a first audio output device of an apparatus. The apparatus provides a first audio-sealing pathway that connects the first audio output device and the first audio input device. The first audio input signal arrives at the first audio input device via the first audio-sealing pathway. The method includes generating, based on the first audio input signal, a recorded representation of the first audio input signal. The method includes determining whether or not the first audio-sealing pathway satisfies an operational criterion based on the recorded representation of the first audio input signal and operational characteristics associated with the first audio-sealing pathway.

In accordance with some embodiments, a device includes one or more processors, non-transitory memory, and one or more programs; the one or more programs are stored in the non-transitory memory and configured to be executed by the one or more processors, and the one or more programs include instructions for performing or causing performance of the operations of any of the methods described herein. In accordance with some embodiments, a non-transitory computer readable storage medium has stored therein instructions which, when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining", or "in response to detecting", depending on the context. Similarly, the phrase "if it is determined" or "if [a stated condition or event] is detected" is, optionally, construed to mean "upon determining", "in response to determining", "upon detecting [the stated condition or event]," or "in response to detecting [the stated condition or event]," depending on the context.

It should be appreciated that in the development of any actual embodiments (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Turning to FIG. 1, FIG. 1 is a simplified block diagram of an audio jamming apparatus 110 (also known as a smart case, a safe case, an active case, an active base, or an audio jamming device) that provides noise signal streams (e.g., noise masking signals), in accordance with some embodiments.

The apparatus 110 includes a controller 112. The controller 112 includes a suitable combination of hardware, software, and firmware that is integrated into the apparatus 110. The controller 112 determines whether or not an audio-sealing pathway satisfies an operational criterion, as described with reference to the controller 320 in FIGS. 3A, 3B, and 4A-4C. In some embodiments, the controller 112 includes a true random number generator (TRNG) 114. Details of the TRNG 114 are provided with reference to the true random number generator 212 in FIG. 2.

In some embodiments, the apparatus 110 includes a housing 115 that receives and holds the personal communication device 140. In some embodiments, the personal communication device 140 is one of a mobile or stationary communication device, including, but not limited to, a cellular phone, a smart phone, a car microphone, a paging device, a wearable device (e.g., a smartwatch), a computer (e.g., a tablet or a laptop), a portable or stationary gaming device, a portable or stationary video or audio device, and/or a combination of the devices described herein. In some embodiments, the personal communication device 140 has communication capabilities and is able to collect information of the surroundings. For example, the personal communication device 140 can include an radio frequency (RF) transceiver, an audio input device, an audio output device, a video input device, a video output device, a near-field communication (NFC) device, a Bluetooth (BL)/Bluetooth low energy (BLE) radio, a Wi-Fi modem, and/or a radio-frequency identification (RFID) device, an accelerometer, a gyroscope, a magnetometer (e.g., as part of an inertial measurement unit (IMU)), a light sensor, and/or acoustic sensors, etc. The information (e.g., audio/video information), once collected by the personal communication device 140, can be transmitted to a remote source using communication interfaces of the personal communication device 140. For example, the remote communication interface can use any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), wideband code division multiple access (W-CDMA), code division multiple access (CDMA), time division multiple access (TDMA), and/or Wi-Fi (e.g., IEEE 802.11a, IEEE 802.11b, IEEE 802.11g, IEEE 802.11n, and/or IEEE 802.11ac), or any other suitable communication protocol, including communication protocols not yet developed as of the filing date of this document.

In some embodiments, the personal communication device 140 includes one or more input devices, e.g., the microphones 142-1, 142-2, 142-3, and 142-4. It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. For example, though FIG. 1 shows the apparatus 110 protecting four microphones 142-1, 142-2, 142-3, and 142-4 on the personal communication device 140, any number of microphones of the personal communication device 140 can be protected by the apparatus 110 described herein. Also, those of ordinary skill in the art will appreciate from the present disclosure that the functions of the components described below can be combined into one or more components and/or further sub-divided into additional sub-components; and, that the components described below are provided as exemplary configuration of the various aspects and functions described herein.

To that end, as a non-limiting example, in some embodiments, the housing 115 is a housing assembly. In some embodiments, the housing assembly further includes sub-assemblies, e.g., a plurality of both moveable parts and non-moveable parts that can form an enclosure when assembled together. The housing 115 thus enables a user to insert the personal communication device 140 into the apparatus 110 for more protection of sensitive information (e.g., in a work mode) or take the personal communication device 140 out of the apparatus 110 for less monitoring of the personal communication by an enterprise (e.g., in a personal mode). For example, the sub-assemblies can include a base and a hood assembly that is moveable. In some embodiments, when the hood assembly is in a first position (e.g., hood down/lowered or clamped), the apparatus 110 is in a first mode of operation (e.g., a privacy protection mode or a work mode). On the other hand, when the hood assembly is in a second position (e.g., hood up or unclamped), the apparatus 110 is in a second mode of operation (e.g., an unprotected mode or a personal mode). In some embodiments, when the apparatus 110 is in the first mode of operation (e.g., the work mode), the hood assembly coordinates with the base engages the audio-seals 134 in order to mate the speakers 130 with the microphones 142. The audio-seals 134 provide audio-sealing pathways between the speakers 130 and the microphones 142. Also, in the first mode of operation (e.g., the work mode), in some embodiments, the apparatus 110 generates noise masking signals. The apparatus outputs the noise masking signals from the speakers 130 towards the microphones 142, passing through the audio-sealing pathways provided by the audio-seals 134.

In some embodiments, one end of each audio-sealing pathway is a respective speaker 130 on the apparatus 110. In some embodiments, each of the audio-seals 134 that forms part of the audio-sealing pathway is made of flexible materials, such that it extends from the surrounding edge of the respective speaker membrane. In some embodiments, the other end of each audio-sealing pathways covers a respective microphone 142 (or the opening of the respective microphone 142) on the personal communication device 140. In some embodiments, the end of the audio-sealing pathway covering (e.g., the speaker 230 along with the audio-seal 234, FIG. 2) is cone-shaped or oval-shaped to better direct the noise masking signals and to enable better audio-sealing of an opening of a microphone 142 on the personal communication device 140. As such, through the audio-seals 134, the speakers 130 of the apparatus 110 are mated with the microphones 142 of the personal communication device 140, e.g., the audio-seal 134-1 mates the speaker 130-1 with the microphone 142-1, the audio-seal 134-2 mates the speaker 130-2 with the microphone 142-2, the audio-seal 134-3 mates the speaker 130-3 with the microphone 142-3, and the audio-seal 134-4 mates the speaker 130-4 with the microphone 142-4.

The audio-sealing pathways from the speakers 130 attenuate outside sound from reaching the microphones 142. For example, the speakers 130 at least partially mask, distort, confuse, reduce, and/or eliminate the ability of the microphones 142 to capture ambient sound. The attenuation provides privacy protection, such as by reducing the ambient sound captured by the microphones 142. Moreover, the audio-sealing pathways define passageways from the output devices (e.g., the speakers 130 of the apparatus 110) to the input devices (e.g., the microphones 142 on the personal communication device 140), so that the output noise signal is fed through the passageways to the input devices. In other words, the audio-sealing pathways from the speakers 130 to the microphones 142 increase the amount of acoustical energy reaching the microphones 142 for better protection of the personal communication device 140 (e.g., the protected device). Further, the sealed paths reduce the amount of noise masking signals from leaking outside the audio-sealing pathways (e.g., reducing the amount of leaked noise masking signals 236 in FIG. 2), thereby reducing the detectability and/or obtrusiveness of the noise masking signals with respect to the outside environment.

In some embodiments, the apparatus 110 includes a digital signal processor 120 supported by the housing 115 and coupled to the speakers 130. Embodiments of the digital signal processor 120 include hardware, software, firmware, or a combination thereof. In some embodiments, the digital signal processor 120 executes instructions stored in non-transitory memory to perform at least certain functions of noise source generation (e.g., the instructions for the noise source 210 in FIG. 2) and/or noise shaping (e.g., the instructions for the noise stream rate controller 220 in FIG. 2). In some embodiments, the controller 112 controls the digital signal processor 120.

In some embodiments, the apparatus 110 also includes a plurality of input devices, e.g., microphones 132-1, 132-2, 132-3, and 132-4. The microphones 132 are at least partially supported by the housing 115. In some embodiments, the microphones 132 record sound independent of the sound recorded by the microphones 142 on the personal communication device 140. In some embodiments, the apparatus 110 transmits the independently recorded sound to an external electronic device through a secure channel for secure communication. In some embodiments, the sound recorded by the microphone(s) 130 is used by an envelope detector 122 included in the apparatus 110 to facilitate noise shaping.

In some embodiments, the envelope detector 122 is coupled to the microphones 132 and the digital signal processor 120. In some embodiments, the envelope detector 122 includes an electronic circuit that takes audio signals (e.g., the ambient sound recorded by one or more of the microphones 132) as an input and provides an output as an envelope associated with the input. The envelope detector 122 thus detects the amplitude variations of the incoming audible signals. In some embodiments, the envelope detector 122 outputs the envelope information to the digital signal processor 120. Based on the envelope information, the digital signal processor 120 directs the speakers 130 to adjust the volume of the output noise signals from the speakers 130 appropriate for the level of ambient sound.

Figure 2:
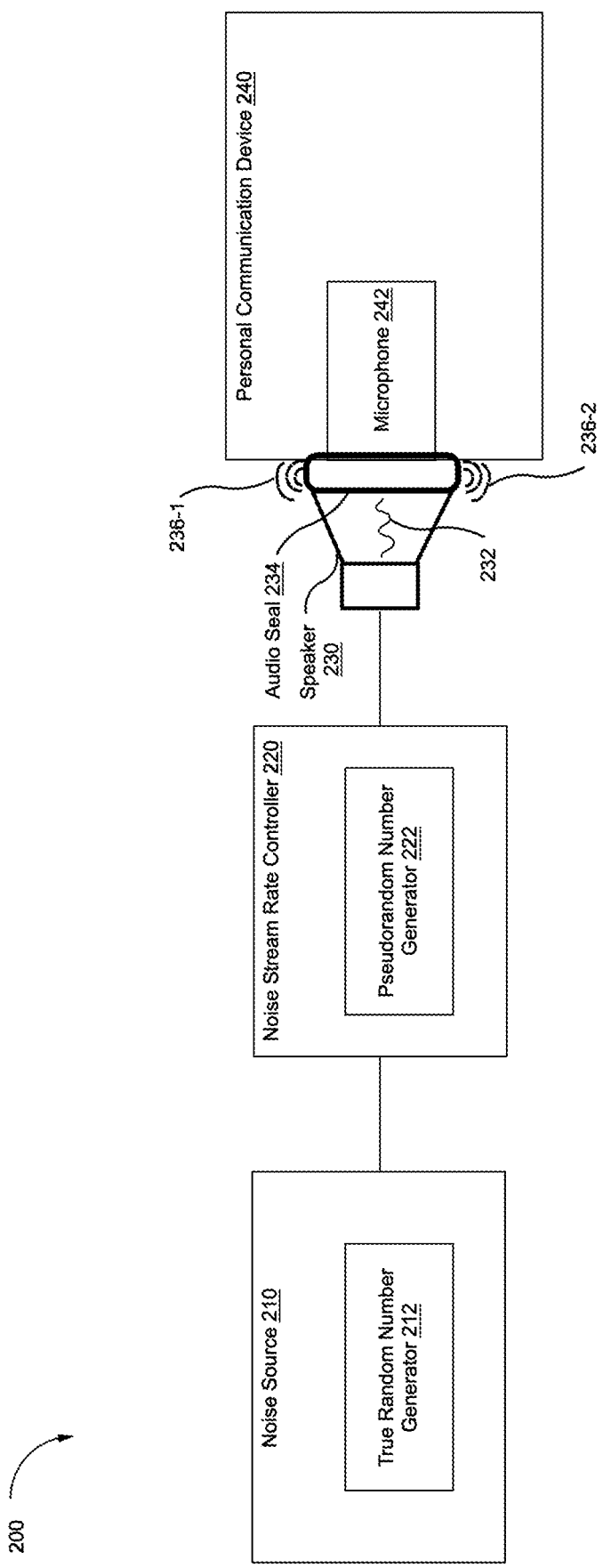
FIG. 2 is a block diagram of an example of a noise masking system in accordance with some embodiments.

Referring to FIG. 2, a simplified block diagram of a noise masking system 200 is illustrated, in accordance with some embodiments. In some embodiments, the noise masking system 200 includes a noise source 210 (e.g., a noise generator), a noise stream rate controller 220, and at least one output device 230 (e.g., a speaker) for directing noise masking signals 232 to a personal communication device 240. In the noise masking system 200, the output device 230 is mateable to an interface 234, such as an audio-seal described with reference to FIG. 1. The interface 234, in accordance with some embodiments, provides a path to direct and/or pass the noise masking signals 232 to a microphone 242 of the personal communication device. The passing of the noise masking signals 232 to the microphone 242 masks the audio content recorded by the microphone 242. It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. Also, those of ordinary skill in the art will appreciate from the present disclosure that the functions of the components described below can be combined into one or more components and/or further sub-divided into additional sub-components; and, that the components described below are provided as exemplary configuration of the various aspects and functions described herein.

To that end, as a non-limiting example, in some embodiments, the noise source 210 generates a random (or pseudo-random) number sequence and provides the generated random number sequence to the noise stream rate controller 220. In some embodiments, the noise source 210 includes an electrical component (e.g., a diode or a resistor) that generates electronic noise. In some embodiments, the electronic noise generated by the noise source 210 is the thermal noise generated by the thermal agitation of the charge carries inside an electrical conductor at equilibrium. As such, in some embodiments, the noise source 210 includes a true random number generator (TRNG) 212 that generates the random number sequence.

In some embodiments, the noise stream rate controller 220 uses the random number sequence as a source and further generates one or more discrete random number sequences. In some embodiments, the noise stream rate controller 220 includes one or more pseudorandom number generators (PRNG) 222, which control the rate of the random number sequence generation without affecting the randomness of the numbers. Connected to the noise stream rate controller 220, the speaker 230 then receives the one or more discrete random number sequences and outputs noise masking signals 232 as a function of the one or more discrete random number sequences. The noise masking signals 232 protect the input device (e.g., a microphone 142 in FIG. 1) on the personal communication device 240 by jamming the audio content recorded by the microphone 242, including a user's speech and/or the ambient sound captured by the microphone 242.

In some embodiments, the interface 234 mates the speaker 230 with the microphone 242. In some embodiments, the interface 234 is made of a foam material (e.g., polymer foam) or other flexible materials (e.g., elastomer). In some embodiments, a sealed path is formed by the interface 234, such as a cavity and/or a tunnel and/or a sound tube. In some embodiments, the sealed path blocks or attenuates outside sound from reaching the microphone 242, thus providing a level of privacy protection. The sealed path also attenuates the amount of masking signals reaching outside of the path, such as a first leaked noise masking signal 236-1 from the upper edge of the seal 234 and a second leaked noise masking signal 236-2 from the lower edge of the seal 234, thereby reducing the obtrusiveness of such signals to the outside environment.

Though FIG. 2 illustrates the noise stream rate controller 220 controlling the noise masking signals feeding to one microphone 242, the noise stream rate controller 220 can provide separate and uncorrelated randomizing chains to one or more microphones in accordance with some embodiments. In such embodiments, separate uncorrelated noise masking signals are fed to each microphone on the personal communication device 240, thus reducing the likelihood of comparing signals from one microphone against another to extract the protected audio content. Further, in some embodiments, in addition to controlling the rate of the random number sequence generation (e.g., with the PRNG 222), the noise stream rate controller 220 also provides noise shaping function in order to produce desired output noise frequency characteristics.

Figure 3A:
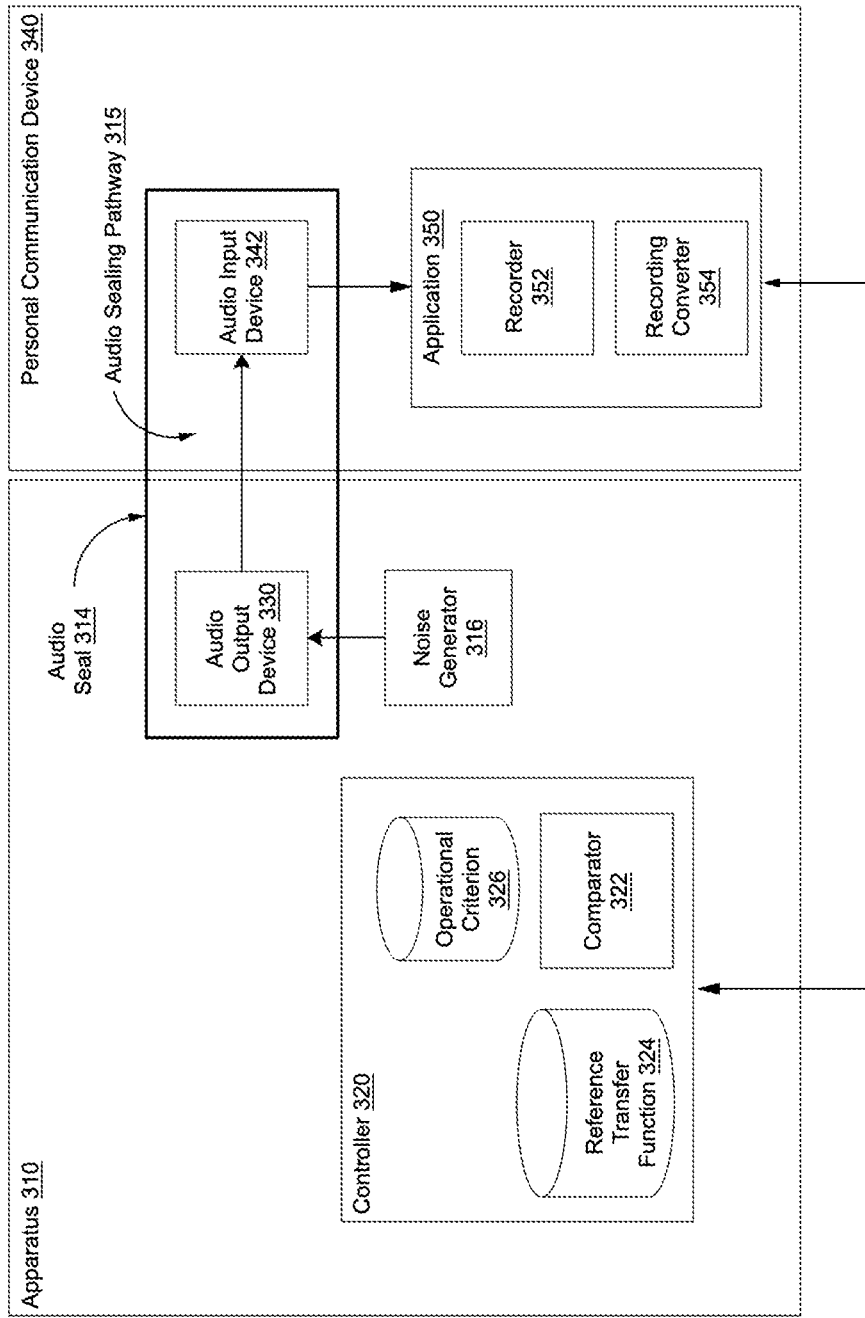
FIG. 3A is a block diagram of an example of an apparatus validating an audio-sealing pathway in accordance with some embodiments.

Referring to FIG. 3A, FIG. 3A is a block diagram of an example of an apparatus 310 validating an audio-sealing pathway 315 in accordance with some embodiments. In some embodiments, the apparatus 310 is similar to and adapted from the apparatus 100 in FIG. 1. The apparatus 310 includes a controller 320, a noise generator 316 (e.g., the noise source 210, the noise stream rate controller 220, or a combination thereof in FIG. 2), and an audio output device 330 (e.g., a speaker). Moreover, the apparatus 310 includes a housing to receive a personal communication device 340 (e.g., the personal communication device 140 in FIG. 1 or the personal communication device 240 in FIG. 2). In some embodiments, the apparatus 310 is arranged to receive and enclose the personal communication device 340.

The housing includes an audio-seal 314 between the audio output device 330 and an audio input device 342 of the personal communication device. For example, the audio input device 342 corresponds to a microphone. The audio-seal 314 provides the audio-sealing pathway 315 between the audio output device 330 and the audio input device 342. In some embodiments, the audio-sealing pathway 315 functions to block the audio input device 342 from sensing ambient audio signals, such as ambient noise or ambient speech of an individual. In some embodiments, the audio-seal 314 corresponds to one of the audio-seals 134 in FIG. 1. In some embodiments, the audio-seal 314 corresponds to the audio-seal 234 in FIG. 2. In some embodiments, the audio-seal 314 includes at least one sound attenuation layer that absorbs sounds.

The noise generator 316 generates a noise signal stream (e.g., random noise optionally including patterns of distinct information) and provides the noise signal stream to the audio output device 330. The audio output device 330 outputs the noise signal stream towards the audio input device 342. The noise signal stream travels from the audio output device 330 towards the audio input device 342 via the audio-sealing pathway 315.

In some embodiments, the personal communication device 340 includes an application 350, such as an app running on a smart phone. The application 350 includes a recorder 352 that generates a recorded representation of the noise signal stream. The recorded representation of the noise signal stream is a function of a transformation of the noise signal stream, by the audio-sealing pathway 315. The transformation characterizes an audio transfer function of the audio-sealing pathway 315.

In some embodiments, the application 350 includes a recording converter 354 that converts the temporal-based recorded representation into a corresponding frequency representation (e.g., a Fast Fourier Transform (FFT)) of the noise signal stream. In some embodiments, the apparatus 310 includes functionality for converting the temporal-based recorded representation into the corresponding frequency representation of the noise signal stream.

The controller 320 of the apparatus 310 receives the recorded representation of the noise signal stream from the personal communication device 340. In some embodiments, the controller 320 is a microcontroller chip (e.g., an integrated circuit (IC)). In some embodiments, the controller 320 is processor or a logic device (e.g., an FPGA or ASIC). The controller 320 determines whether or not the audio-sealing pathway 315 satisfies an operational criterion (e.g., stored in an operational criterion datastore 326) based on the recorded representation of the noise signal stream and a reference transfer function (e.g., stored in a reference transfer function datastore 324). The reference transfer function is associated with the audio-sealing pathway 315. In some embodiments, the reference transfer function characterizes a reference noise signal stream that traverses the audio-sealing pathway 315 when the first audio-sealing 315 pathway satisfies the operational criterion. In some embodiments, the apparatus 310 allocates memory for the operational criterion datastore 326 and the reference transfer function datastore 324, such as within the controller 320 (as illustrated in FIG. 3A) or outside of the controller 320 (e.g., a RAM integrated in the apparatus 310).

In some embodiments, the controller 320 includes a comparator 322 that compares the audio transfer function of the first audio-sealing pathway against the reference transfer function in order to determine whether the audio-sealing pathway 315 satisfies the operational criterion. For example, the comparator 322 determines whether or not the audio transfer function is between an upper boundary function and a lower boundary function associated with the reference transfer function. In response to determining that the audio transfer function is between the upper boundary function and the lower boundary function, the controller 320 validates the audio-sealing pathway 315 (e.g., determines that the audio-sealing pathway 315 satisfies the operational criterion). As another example, the comparator 322 determines whether or not the audio transfer function and the reference transfer function satisfy a similarity threshold with respect to each other. In response to determining that the audio transfer function and the reference transfer function satisfy the similarity threshold with respect to each other, the controller 320 validates the audio-sealing pathway 315.

In some embodiments, the application 350 aids the controller 320 in determining whether the audio-sealing pathway 315 satisfies the operational criterion. To that end, in some embodiments, the controller 320 provides the reference transfer function to the personal communication device 340 and receives back a validation indicator that is indicative of a comparison between the recorded representation of the noise signal stream and the reference transfer function. In some embodiments, the controller 320 provides operational characteristics associated with the audio-sealing pathway 315 to the personal communication device 340 and receives back a validation indicator that is indicative of a comparison between the recorded representation of the noise signal stream and the operational characteristics. For example, with reference to FIG. 5, the operational characteristics includes an upper boundary function 506a and a lower boundary function 506b associated with the audio-sealing pathway 315, such as is determined at the time of manufacturing of the apparatus 310.

Figure 3B:
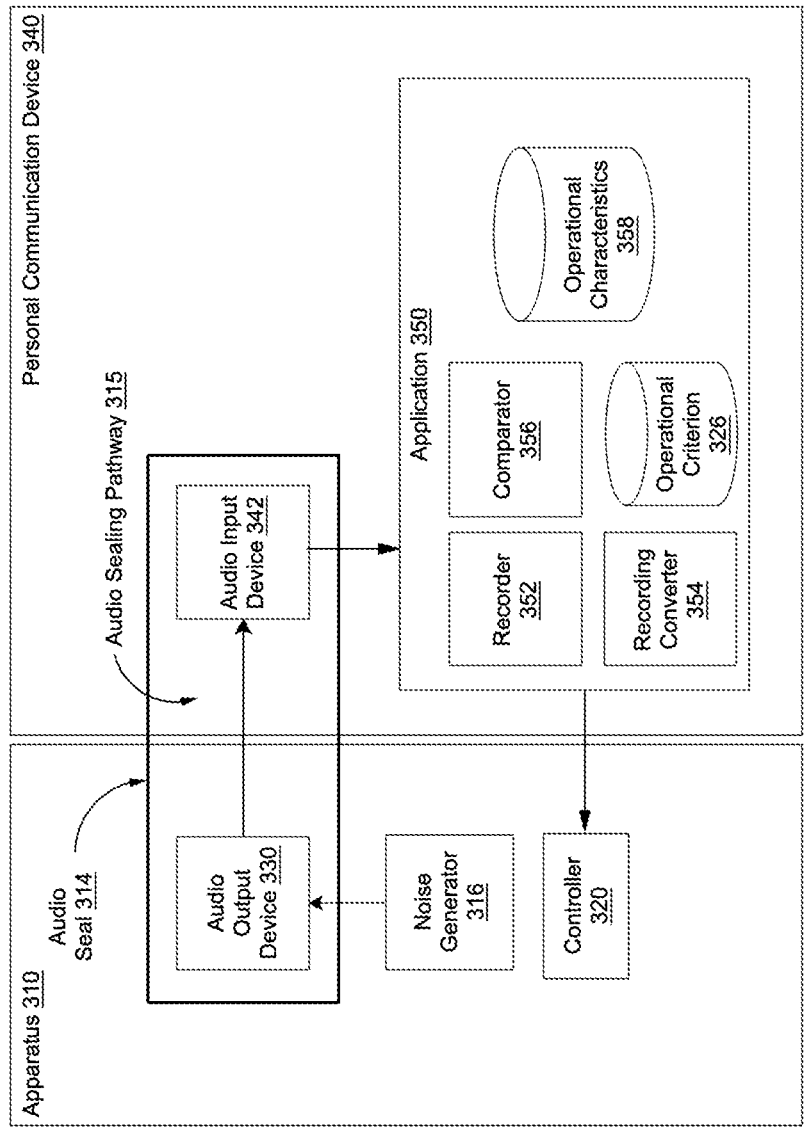
FIG. 3B is a block diagram of an example of a personal communication device validating an audio-sealing pathway in accordance with some embodiments.

FIG. 3B is a block diagram of an example of the personal communication device 340 validating the audio-sealing pathway 315 in accordance with some embodiments. In contrast to the apparatus 310 illustrated in FIG. 3A, the personal communication device 340 validates the operation of the audio-sealing pathway 315 in FIG. 3B. To that end, in some embodiments, the application 350 of the personal communication device 340 determines whether or not the audio-sealing pathway 315 satisfies the operational criterion.

In some embodiments, the application 350 includes a comparator 356 that compares a recorded representation of an audio input signal and operational characteristics (e.g., stored on the operational characteristics datastore 358) associated with the audio-sealing pathway 315, as is described with reference to FIG. 3A. The audio input signal is based on a noise signal stream output from the audio output device 330. The audio input signal arrives at the audio input device 342 via the audio-sealing pathway 315.

In some embodiments, the application 350 provides a validation indicator to the controller 320 of the apparatus 310, as illustrated in FIG. 3B. The validation indicator is indicative of whether or not the audio-sealing pathway 315 satisfies the operational criterion. Accordingly, both the apparatus 310 and the personal communication device 340 are apprised of whether or not the audio-sealing pathway 315 has been compromised.

Figure 4A:
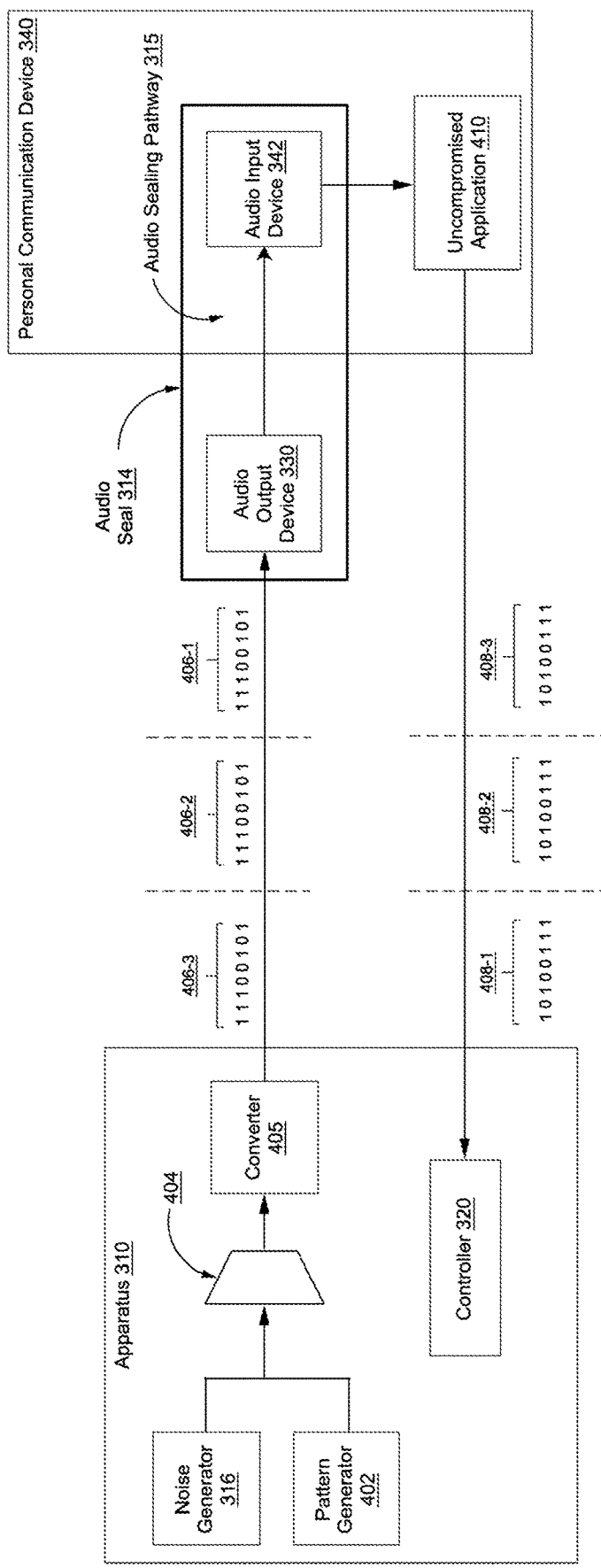
FIG. 4A is a block diagram of an example of utilizing patterns of distinct information to determine whether an audio-sealing pathway is operational in accordance with some embodiments.

FIG. 4A is a block diagram of an example of utilizing patterns of distinct information to determine whether an audio-sealing pathway is operational in accordance with some embodiments. To that end, in some embodiments, the apparatus 310 generates, and provides to the personal communication device 340, a noise signal stream that includes patterns of distinct information, such as a song, human speech, wind noise, etc. As part of determining whether the audio-sealing pathway 315 satisfies the operational criterion, the apparatus 310 determines whether or not a recorded representation of the noise signal stream, received from an application on the personal communication device 340, includes a representation of the patterns of distinct information.

For example, as illustrated in FIG. 4A, the apparatus 310 includes the noise generator 316 that generates a noise signal, such as random or pseudorandom noise. Moreover, the apparatus 310 includes a pattern generator 402 that generates one or more patterns to be added (e.g., merged, combined, or appended) into the noise signal. In some embodiments, the apparatus 310 includes a multiplexer 404 that adds the one or more patterns to the noise signal. For example, the multiplexer 404 periodically adds the one or more patterns to the noise signal. In some embodiments, the apparatus 310 includes a converter 405, which, for example, converts an analog output of the multiplexer 404 into a digital representation. Accordingly, the apparatus 310 generates a noise signal stream 406-1, 406-2, 406-3, . . . , 406-N that includes patterns of distinct information. Namely, as illustrated in FIG. 4A, the noise signal stream 406 is comprised of a plurality (e.g., 406-1, 406-2, 406-3, . . . , 406-N) of eight-bit segments, each of the eight-bit segments including a common pattern of "1 1 1 0 0 1 1 1."

As illustrated in FIG. 4A, the personal communication device 340 includes an uncompromised (e.g., unhacked) application 410 that generates a recorded representation of the noise signal stream 408-1, 408-2, 408-3, . . . , 408-N. The recorded representation of the noise signal stream 408 includes a plurality (e.g., 408-1, 408-2, 408-3, . . . , 408-N) of eight-bit segments including the common pattern, but in a reversed ordering on a per segment basis as compared with the noise signal stream 406. For example, a first eight-bit segment of the noise signal stream 406-1 includes "1 1 1 0 0 1 0 1," and a corresponding first eight-bit segment of the recorded representation of the noise signal stream 408-1 includes "1 0 1 0 0 1 1 1." Accordingly, the recorded representation of the noise signal stream 408 includes a representation of the pattern of distinct information that is within the noise signal stream 406. Thus, the apparatus 310 determines, within a certain level of confidence, that the audio-sealing pathway 315 is operational and that an application (e.g., uncompromised application 410) executing on the personal communication device 340 has not been compromised.

Figure 4B:
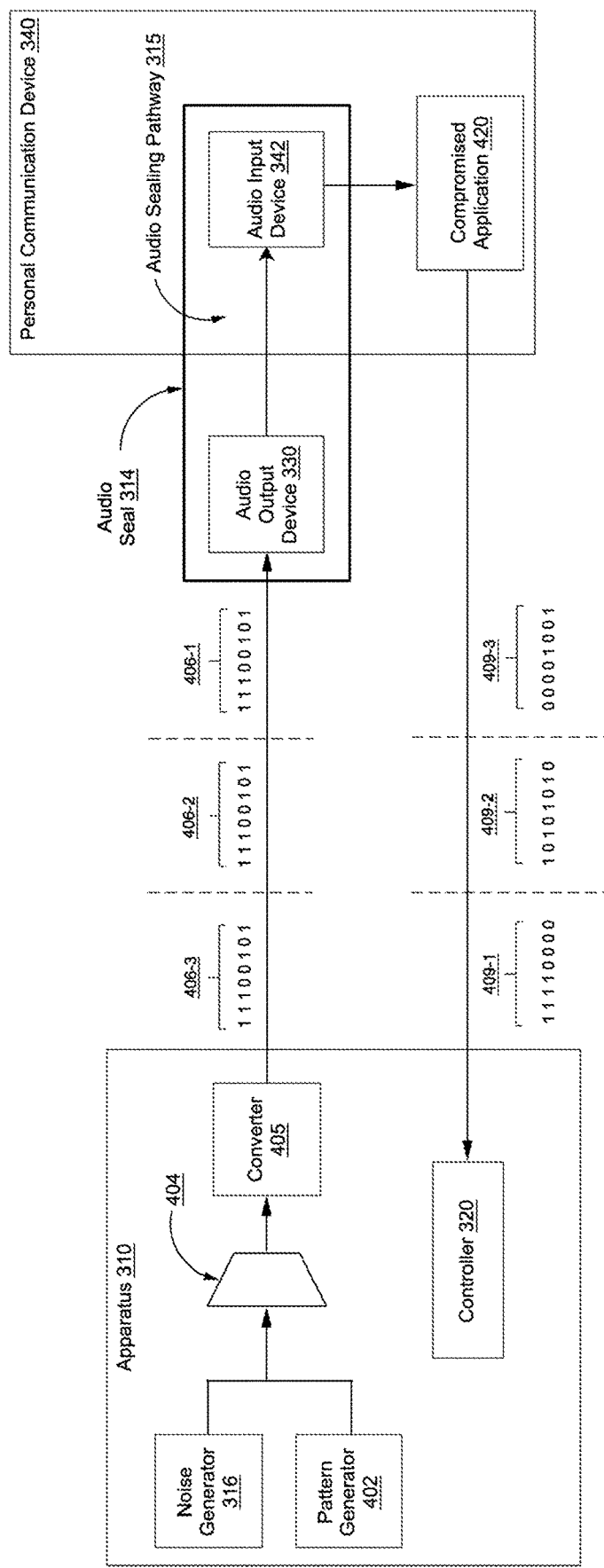
FIG. 4B is a block diagram of another example of utilizing patterns of distinct information to determine whether an audio-sealing pathway is operational in accordance with some embodiments.

On the other hand, as illustrated in FIG. 4B, the personal communication device 340 includes a compromised application 420, such as an application that has been hacked or infected. Accordingly, the compromised application 420 generates a recorded representation of a noise signal stream 409-1, 409-2, 409-3 . . . 409-N that does not include a representation of the patterns of distinct information within the corresponding noise signal stream 406-1, 406-2, 406-3 . . . 406-N. Namely, each eight-bit segment of the recorded representation of a noise signal stream 409 bears little or no relationship to a corresponding eight-bit segment of the corresponding noise signal stream 406-1. Thus, the apparatus 310 determines, within a certain level of confidence, that the application (e.g., compromised application 420) executing on the personal communication device 340 has been compromised.

Figure 4C:
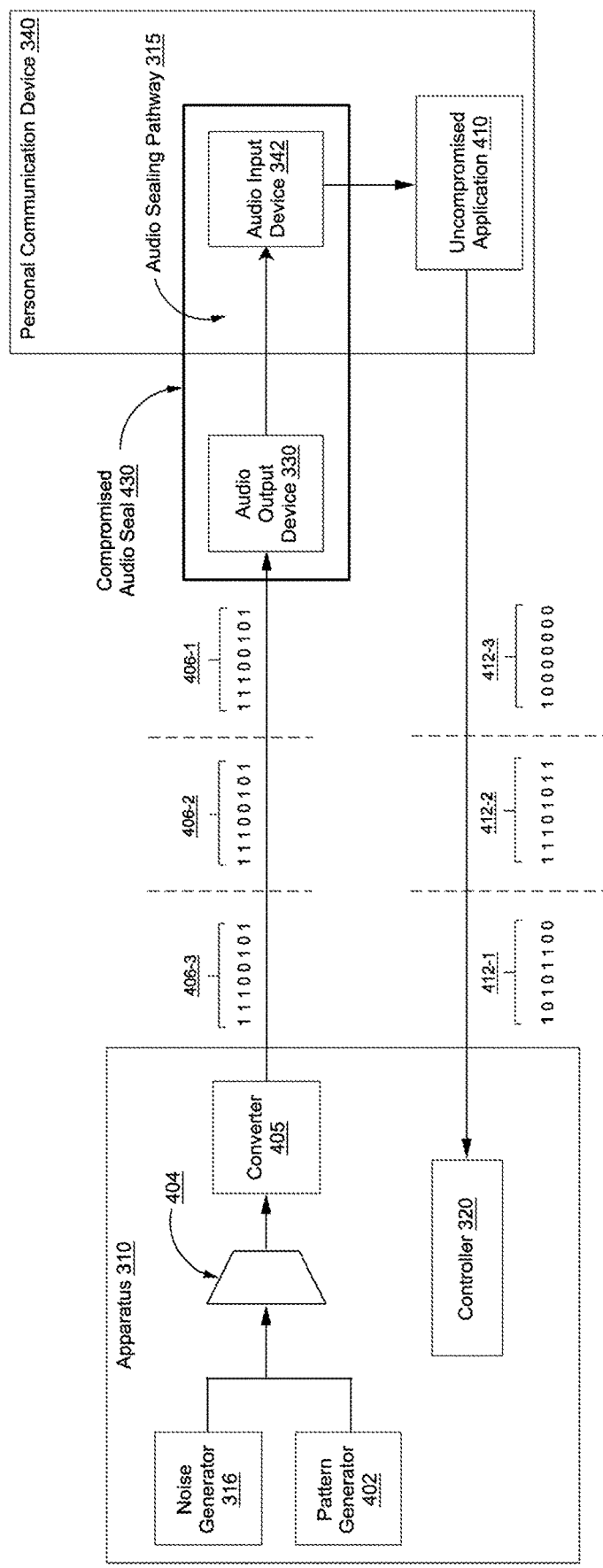
FIG. 4C is a block diagram of yet another example of utilizing patterns of distinct information to determine whether an audio-sealing pathway is operational in accordance with some embodiments.

FIG. 4C is a block diagram of yet another example of utilizing patterns of distinct information to determine whether an audio-sealing pathway is operational in accordance with some embodiments. As illustrated in FIG. 4C, the personal communication device 340 includes the uncompromised application 410. However, the audio-sealing pathway 315 is provided by a compromised (e.g., damaged) audio seal 430. For example, an individual may damage an audio seal, such as an insider who cuts holes in or otherwise damages the audio seal. The resulting compromised audio seal 430 allows ambient sounds (e.g. speech) to leak into the audio input device 342, while allowing noise (e.g., masking) signals to leak out of the audio output device 330. Without utilizing the controller 320, a person would need to inspect the compromised audio seal 430 in order to detect and assess the damage. As illustrated in FIG. 4C, the controller 320 determines that the audio-sealing pathway 315 (provided by the compromised audio seal 430) does not satisfy an operational criterion because a recorded representation of a noise signal stream 412-1, 412-2, 412-3 . . . 412-N does not include a representation of the patterns of distinct information within the corresponding noise signal stream 406-1, 406-2, 406-3 . . . 406-N. Accordingly, the controller 320 detects the compromised audio seal 430, without inspection by a person.

Moreover, by comparing the corresponding noise signal stream 406-1, 406-2, 406-3 . . . 406-N against the recorded representation of a noise signal stream 412-1, 412-2, 412-3 . . . 409-N, the controller 320 may determine problems with the noise signals sent to the audio input device 342. Additionally, based on the comparison, the controller 320 may determine issues with the audio output device 330 and/or the audio input device 342.

Figure 5:
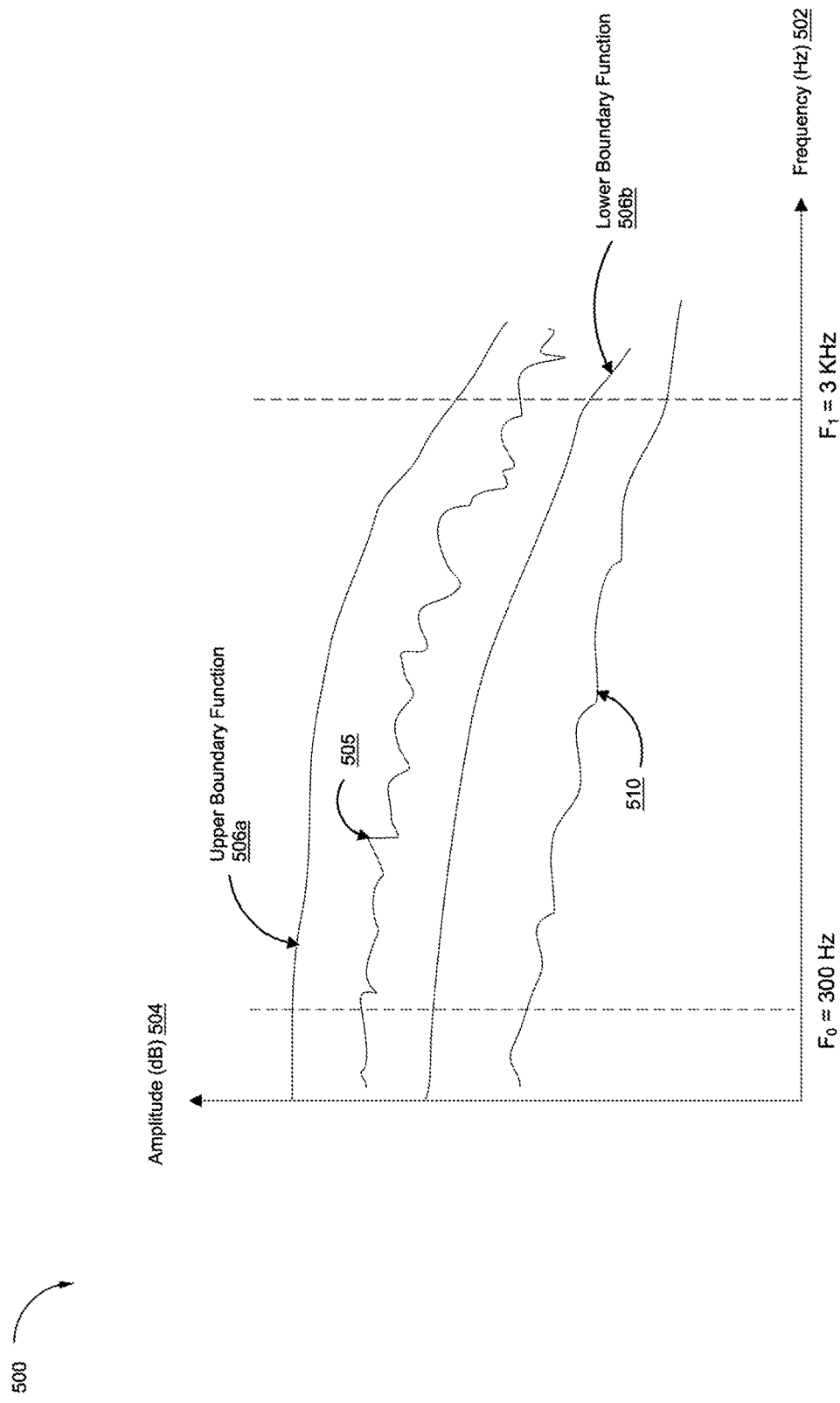
FIG. 5 is a graphical representation of an example of utilizing boundary functions to validate an audio-sealing pathway in accordance with some embodiments.

FIG. 5 is a graphical representation 500 of an example of utilizing boundary functions to validate an audio-sealing pathway in accordance with some embodiments. The x-axis of the graphical representation 500 corresponds to frequency (Hz) 502 and the y-axis corresponds to amplitude (dB) 504. The graphical representation 500 includes an upper boundary function 506a and a lower boundary function 506b associated with operational characteristics of an audio-seal that provides the audio-sealing pathway. In some embodiments, the upper boundary function 506a and the lower boundary function 506b collectively define the bounds of an operational audio-sealing pathway, such as is determined at the time of testing or manufacturing an apparatus that includes the audio-seal. In other words, the upper boundary function 506a and the lower boundary function 506b bound the frequency response of an operational audio-seal.

The graphical representation 500 includes a first frequency response 505 associated with a first audio-seal, such as the first audio-seal 134-1 of the apparatus 110 in FIG. 1. In some embodiments, the apparatus 110 determines that a first audio-sealing provided by the first audio-seal 134-1 satisfies an operational criterion (e.g., is operational) because the first frequency response 505 is bounded by (e.g., is within or between) the upper boundary function 506a and the lower boundary function 506b.

The graphical representation 500 includes a second frequency response 510 associated with a second audio-seal, such as the second audio-seal 134-2 of the apparatus 110 in FIG. 1. In some embodiments, the apparatus 110 determines that a second audio-sealing provided by the second audio-seal 134-1 does not satisfy the operational criterion (e.g., is not operational) because the first frequency response 505 is not bounded by (e.g., is within or between) the upper boundary function 506a and the lower boundary function 506b. In some embodiments, the region of the graphical representation 500 below the lower boundary function 506b corresponds to a leakage region, such as caused by a leaky audio-sealing pathway. For example, a defect in the sealing material or absorbing material of an audio-seal may cause leakage of a noise signal stream output from an audio output device of an apparatus towards an audio input device of a personal communication device. Accordingly, the leakage may reduce the amplitude of a corresponding frequency response to less than an amplitude of the lower boundary function 506b.

Figure 6:
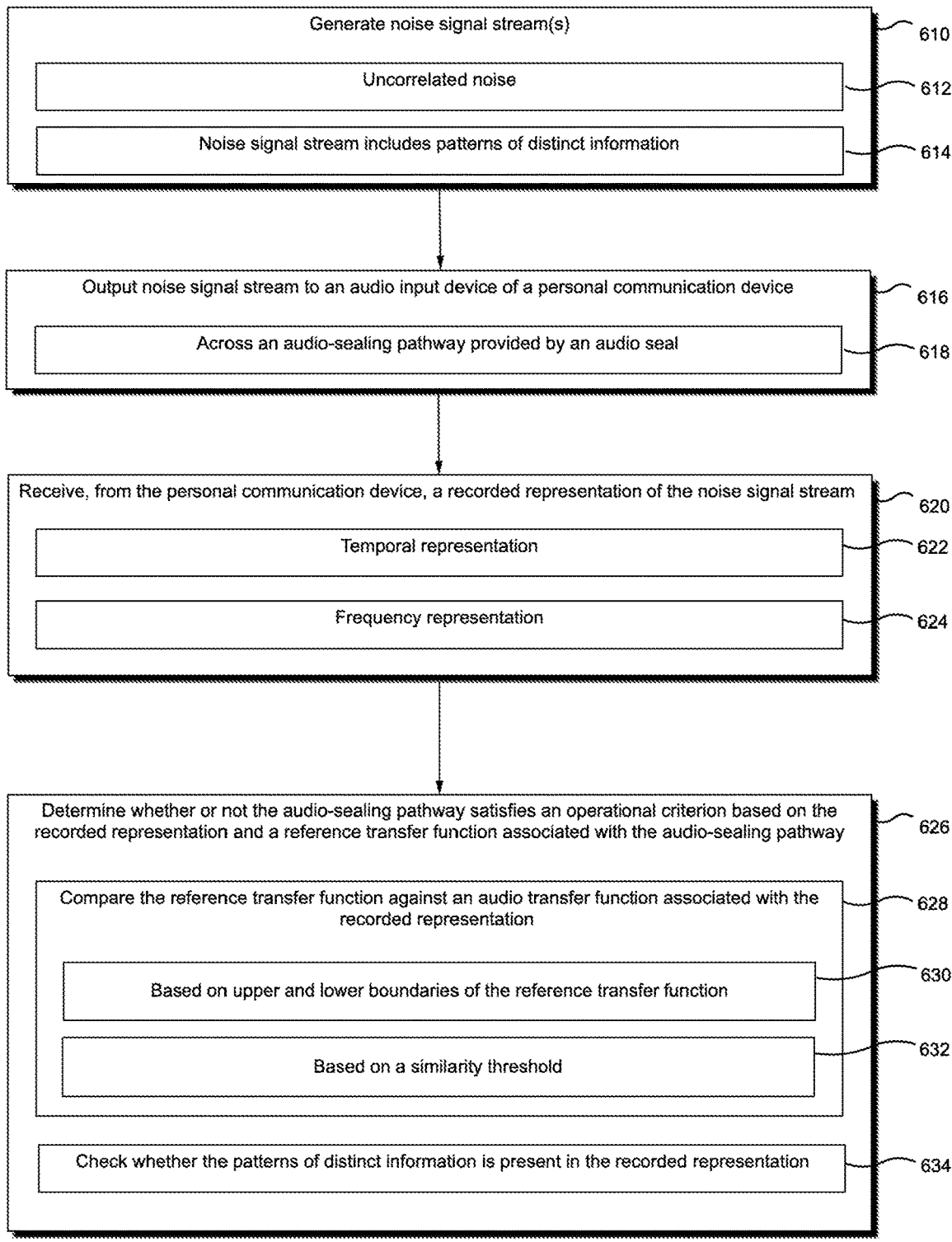
FIG. 6 is a flowchart illustrating a method of validating an audio-sealing pathway by an apparatus in accordance with some embodiments.

FIG. 6 is a flowchart illustrating a method 600 of validating an audio-sealing pathway by an apparatus in accordance with some embodiments. In some embodiments, the method 600, or portions thereof, is performed by the apparatus 110. In some embodiments, the method 600, or portions thereof, is performed by the apparatus 310. The apparatus includes a controller, a noise generator, a first audio output device, and a housing to receive a personal communication device. The housing includes a first audio-seal between the first audio output device and a corresponding first audio input device of the personal communication device.

As represented by block 610, the method 600 includes generating, by the noise generator, a first noise signal stream, such as by the noise source 210 or the noise generator 316. For example, the noise generator generates one or more noise signal streams as masking signals and provides the masking signals to a sound shaper included in the apparatus. In some embodiments, the masking signals from the noise generator include a random (or pseudo-random) number sequence. The sound shaper shapes the masking signals by modifying characteristics of the masking signal, e.g., by spectral shaping and/or adjusting the amplitude, etc. In some embodiments, the sound shaper receives feedback for calibration. The sound shaper thus can produce a desired output frequency response through a feedback loop.

In some embodiments, the method 600 includes generating, by the noise generator, a second noise signal stream. For example, in some embodiments, a first audio output device of the apparatus directs the first noise signal stream to a corresponding first audio input device of the personal communication device via a first audio-sealing pathway. Continuing with the example, a second audio output device of the apparatus directs the second noise signal stream to a corresponding second audio input device of the personal communication device via a second audio-sealing pathway.

As represented by block 612, in some embodiments. the first noise signal stream and the second noise signal stream are uncorrelated with respect to each other. The uncorrelated noise masking signals provided by the apparatus described herein make it more difficult to derive the protected audio content through elaborated efforts, e.g., by comparing and/or corroborating the audio signals from different microphones on the user equipment. Thus, relative to a conventional privacy protection device, methods, personal communication devices, and apparatuses disclosed herein are more effective in user privacy protection. In accordance with some embodiments, the apparatus synthesizes one random number sequence to produce uncorrelated keys. The apparatus then uses the uncorrelated keys as random seeds to generate uncorrelated discrete random number sequences. The uncorrelated discrete random number sequences form separate noise streams in separate randomizing chains. Each of the randomizing chain is connected to an audio output device (e.g., a speaker) of the apparatus, so that separate noise streams are fed to separate output devices (e.g., speakers). In some embodiments, each of the speakers is mateable (e.g., by the audio-seal) with a respective audio input device (e.g., a microphone) of the personal communication device. Thus, uncorrelated noise masking signals are passed to the audio input devices on the personal communication device and mixed with ambient sound recorded by the audio input devices in accordance with some embodiments.

As represented by block 614, in some embodiments, the first noise signal stream includes patterns of distinct information, such as described with reference to FIGS. 4A, 4B, and 4C. For example, the patterns of distinct information include a series of beeps or tones. As another example, the patterns correspond to frequency patterns of noise (e.g., white, blue, pink, gray, etc.). As yet another example, the patterns of distinct information include wind noises, running water noises, traffic sounds, a song, human speech, and/or the like.

As represented by block 616, the method 600 includes outputting, via the first audio output device, the first noise signal stream towards the corresponding first audio input device of the personal communication device. As represented by block 618, the first noise signal stream travels from the first audio output device towards the corresponding first audio input device via a first audio-sealing pathway provided by the first audio-seal. For example, with reference to FIG. 2, an apparatus outputs the noise masking signals 232, via the speaker 230, towards the microphone 242 of the personal communication device 240. As another example, with reference to FIG. 3A, the apparatus 310 outputs, via the audio output device 330, a noise signal stream towards the audio input device 342 of the personal communication device 340. Continuing with this example, the noise signal stream travels from the audio output device 330 towards the audio input device 342 via an audio-sealing pathway 315 provided by the audio-seal 314.

As represented by block 620, the method 600 includes receiving a recorded representation of the first noise signal stream from the personal communication device. The recorded representation of the first noise signal stream is a function of a transformation of the first noise signal stream, by the first audio-sealing pathway. The transformation characterizes a first audio transfer function of the first audio-sealing pathway. As represented by block 622, in some embodiments, the recorded representation of the first noise signal stream corresponds to a temporal representation of the first noise signal stream. As represented by block 624, in some embodiments, the recorded representation of the first noise signal stream corresponds to a frequency representation of the first noise signal stream.

As represented by block 626, the method 600 includes determining, by the controller, whether or not the first audio-sealing pathway satisfies an operational criterion based on the recorded representation of the first noise signal stream and a reference transfer function associated with the first audio-sealing pathway. The controller may obtain or determine the reference transfer function. In some embodiments, the reference transfer function characterizes a reference noise signal stream that traverses the first audio-sealing pathway when the first audio-sealing pathway satisfies the operational criterion. In some embodiments, the reference transfer function corresponds to a temporal representation of the reference noise signal stream. In some embodiments, the method 600 includes performing an inverse FFT on a frequency characterization of the reference noise signal stream in order to determine the temporal-based reference transfer function. In some embodiments, the reference transfer function corresponds to a frequency representation of the reference noise signal stream. In some embodiments, the method 600 includes performing an FFT on a temporal characterization of the reference noise signal stream in order to determine the frequency-based reference transfer function.

As represented by block 628, in some embodiments, the method 600 includes comparing the first audio transfer function of the first audio-sealing pathway against the reference transfer function. In some embodiments, the method 600 includes making the comparison a number of times, over a relatively large time window, in order to account for drift.

As represented by block 630, in some embodiments, the method 600 includes comparing the first audio transfer function against upper and lower boundaries of the reference transfer function. For example, with reference to FIG. 5, the controller compares the first frequency response 505 associated with an audio-sealing pathway against an upper boundary function 506a and against a lower boundary function 506b in order to determine whether or not the audio-sealing pathway satisfies the operational criterion.

As represented by block 632, in some embodiments, the method 600 includes determining that the first audio-sealing pathway satisfies the operational criterion in response to determining that a result of comparing the first audio transfer function of the first audio-sealing pathway against the reference transfer function satisfies a similarity threshold. Moreover, in some embodiments, the method 600 includes determining that the first audio-sealing pathway does not satisfy the operational criterion in response to determining that the result does not satisfy the similarity threshold.

As represented by block 634, in some embodiments, the method includes determining whether or not the recorded representation of the first noise signal stream includes a representation of the patterns of distinct information in order to determine whether or not the first audio-sealing pathway satisfies the operational criterion. For example, with reference to FIG. 4A, the apparatus 310 determines that patterns of distinct information, included in a noise signal stream 406, are represented in a recorded representation of the noise signal stream 408. As a counterexample, with reference to FIG. 4B, the apparatus 310 determines that the patterns of distinct information are not represented in a recorded representation of the noise signal stream 409.

Figure 7:
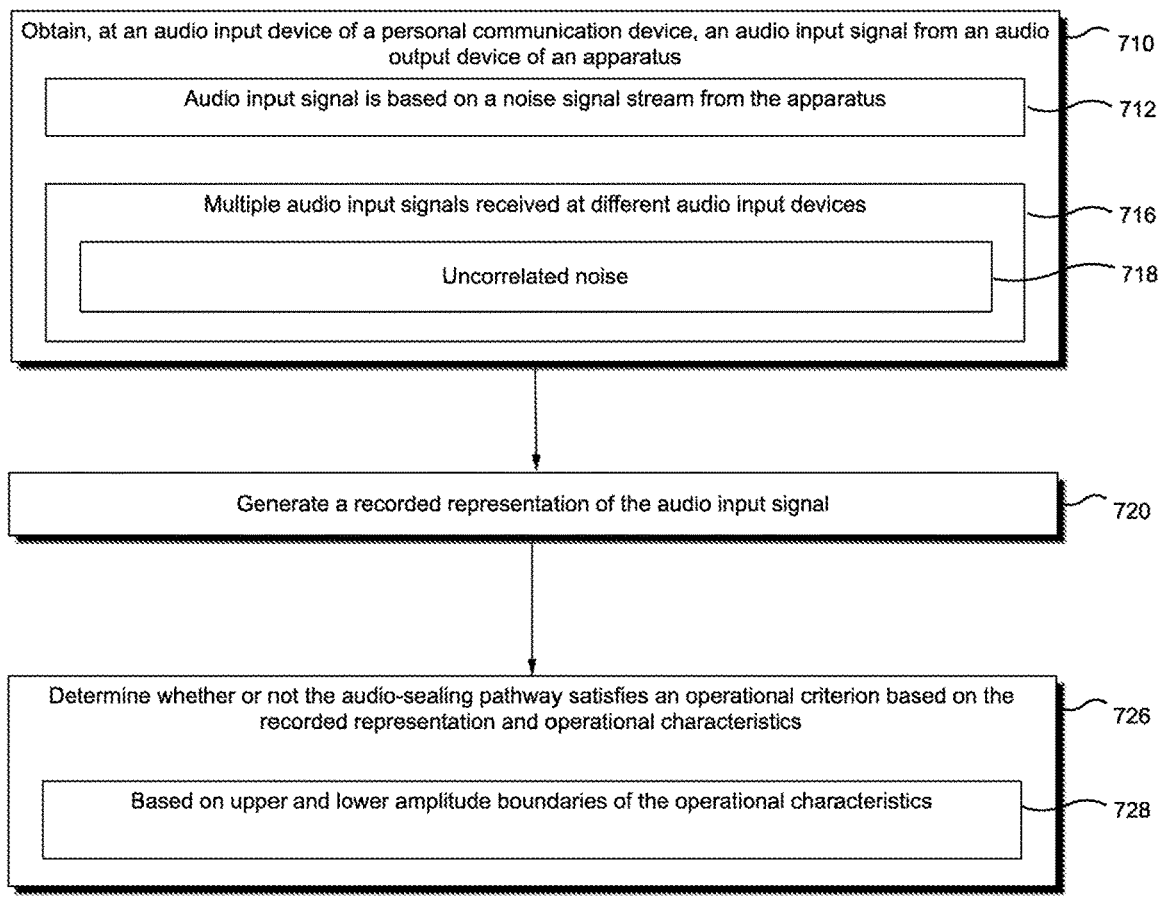
FIG. 7 is a flowchart illustrating a method of validating an audio-sealing pathway by a personal communication device in accordance with some embodiments.

FIG. 7 is a flowchart illustrating a method 700 of validating an audio-sealing pathway by a personal communication device in accordance with some embodiments. In some embodiments, the method 700, or portions thereof, is performed by the personal communication device 140. In some embodiments, the method 700, or portions thereof, is performed by the personal communication device 340. The personal communication device includes one or more processors, a non-transitory memory, and a first audio input device.

As represented by block 710, the method 700 includes obtaining, at the first audio input device, a first audio input signal. As represented by block 712, the first audio input signal is based on a first noise signal stream output from a first audio output device of an apparatus. The apparatus provides a first audio-sealing pathway that connects the first audio output device and the first audio input device. The first audio input signal arrives at the first audio input device via the first audio-sealing pathway.

As represented by block 716, in some embodiments, the personal communication device includes a second audio input device, and the method 700 includes obtaining, at the second audio input device, a second audio input signal. The second audio input signal is based on a second noise signal stream output from a second audio output device of the apparatus. The apparatus provides a second audio-sealing pathway that connects the second audio output device and the second audio input device. The second audio input signal arrives at the second audio input device via the second audio-sealing pathway.

As represented by block 718, in some embodiments, the first noise signal stream and the second noise signal stream are uncorrelated with respect to each other. The uncorrelated noise masking signals provided by the apparatus described herein make it more difficult to derive the protected audio content through elaborated efforts, e.g., by comparing and/or corroborating the audio signals from different microphones on the user equipment. Thus, relative to conventional privacy protection devices, methods, and systems, the apparatus herein is more effective in user privacy protection. In accordance with some embodiments, the apparatus synthesizes one random number sequence to produce uncorrelated keys. The apparatus then uses the uncorrelated keys as random seeds to generate uncorrelated discrete random number sequences. The uncorrelated discrete random number sequences form separate noise streams in separate randomizing chains. Each of the randomizing chain is connected to an audio output device (e.g., a speaker) of the apparatus, so that separate noise streams are fed to separate output devices (e.g., speakers). In some embodiments, each of the speakers is mateable (e.g., by the audio-seal) with a respective audio input device (e.g., a microphone) of the personal communication device. Thus, uncorrelated noise masking signals are passed to the audio input devices on the personal communication device and mixed with ambient sound recorded by the audio input devices in accordance with some embodiments.

As represented by block 720, the method 700 includes generating, based on the first audio input signal, a recorded representation of the first audio input signal. In some embodiments, the recorded representation of the first audio input signal corresponds to a frequency representation (e.g., an FFT) of the first audio input signal. In some embodiments, the method 700 includes recording the first audio input signal and buffering the recorded signal. In some embodiments, the method 700 includes generating, based on the second audio input signal, a recorded representation of the second audio input signal.

As represented by block 722, the method 700 includes determining whether or not the first audio-sealing pathway satisfies an operational criterion based on the recorded representation of the first audio input signal and operational characteristics associated with the first audio-sealing pathway. In some embodiments, the operational characteristics include a lower amplitude boundary function and an upper amplitude boundary function, such as described with reference to FIG. 5. For example, in some embodiments, as represented by block 728, determining whether or not the first audio-sealing pathway satisfies the operational criterion includes determining whether or not the frequency representation of the first audio input signal is between the lower amplitude boundary function and the upper amplitude boundary function included in the operational characteristics. As another example, in some embodiments, the method 700 includes determining that the first audio-sealing pathway satisfies the operational criterion in response to determining that a result of comparing the recorded representation of the first audio input signal against the operational characteristics satisfies a similarity threshold. Moreover, in some embodiments, the method 700 includes determining that the first audio-sealing pathway does not satisfy the operational criterion in response to determining that the result does not satisfy the similarity threshold.

In some embodiments, the method 700 includes determining whether or not the second audio-sealing pathway satisfies the operational criterion based on the recorded representation of the second audio input signal and operational characteristics associated with the second audio-sealing pathway.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an apparatus including a controller, a noise generator, a first audio output device, and a housing to receive a personal communication device, wherein the housing includes a first audio-seal providing a first audio-sealing pathway between the first audio output device and a corresponding first audio input device of the personal communication device, the first audio-seal covers the first audio input device when the apparatus holds the personal communication device, the method comprising,
generating, by the noise generator, a first noise signal stream;
outputting, via the first audio output device, first noise masking signals based on the first noise signal stream towards the corresponding first audio input device of the personal communication device, wherein the first noise masking signals travel from the first audio output device towards the corresponding first audio input device of the personal communication device via a first audio-sealing pathway provided by the first audio-seal;
receiving, from an application on the personal communication device, a recorded representation of the first noise masking signals from the personal communication device, wherein the recorded representation of the first noise masking signals is a function of a transformation of the first noise signal stream, by the first audio-sealing pathway, and wherein the transformation characterizes a first audio transfer function of the first audio-sealing pathway; and determining, by the controller, whether or not the first audio-sealing pathway satisfies an operational criterion based on the recorded representation of the first noise masking signals and a reference transfer function associated with the first audio-sealing pathway.

2. The method of claim 1, wherein the reference transfer function characterizes a reference noise signal stream that traverses the first audio-sealing pathway when the first audio-sealing pathway satisfies the operational criterion.

3. The method of claim 2, wherein the recorded representation of the first noise masking signals correspond to a temporal representation of the first noise signal stream, and wherein the reference transfer function corresponds to a temporal representation of the reference noise signal stream.

4. The method of claim 2, wherein the recorded representation of the first noise masking signals correspond to a frequency representation of the first noise signal stream, and wherein the reference transfer function corresponds to a frequency representation of the reference noise signal stream.

5. The method of claim 1, wherein determining whether or not the first audio-sealing pathway satisfies the operational criterion includes comparing the first audio transfer function of the first audio-sealing pathway against the reference transfer function.

6. The method of claim 5, further comprising:
determining that the first audio-sealing pathway satisfies the operational criterion in response to determining that a result of comparing the first audio transfer function of the first audio-sealing pathway against the reference transfer function satisfies a similarity threshold; and
determining that the first audio-sealing pathway does not satisfy the operational criterion in response to determining that the result does not satisfy the similarity threshold.

7. The method of claim 1, further comprising:
providing the reference transfer function to the personal communication device; and
receiving, from the personal communication device, a validation indicator that is indicative of a comparison between the recorded representation of the first noise masking signals and the reference transfer function;
wherein determining whether or not the first audio-sealing pathway satisfies an operational criterion is a function of the validation indicator.

8. The method of claim 1, wherein the first noise signal stream includes patterns of distinct information, and wherein determining whether or not the first audio-sealing pathway satisfies the operational criterion includes determining whether or not the recorded representation of the first noise signal stream includes a representation of the patterns of distinct information.

9. The method of claim 1, wherein the housing includes a second audio-seal between a second audio output device of the apparatus and a corresponding second audio input device of the personal communication device, the method further comprising:
generating, by the noise generator, a second noise signal stream;
outputting, via the second audio output device, second noise masking signals based on the second noise signal stream towards the corresponding second audio input device of the personal communication device, wherein the second noise masking signals travel from the second audio output device towards the corresponding second audio input device of the personal communication device via a second audio-sealing pathway provided by the second audio-seal;
receiving, from the application on the personal communication device, a recorded representation of the second noise signal stream masking signals from the personal communication device, wherein the recorded representation of the second noise masking signals is a function of a transformation of the second noise signal stream, by the second audio-sealing pathway, and wherein the transformation characterizes a second audio transfer function of the second audio-sealing pathway; and
determining, at the controller, whether or not the second audio-sealing pathway satisfies the operational criterion based on the recorded representation of the second noise masking signals and a reference transfer function associated with the second audio-sealing pathway.

10. The method of claim 9, wherein the first noise signal stream and the second noise signal stream are uncorrelated with respect to each other.

11. A method comprising:
at a personal communication device including one or more processors, a non-transitory memory, and a first audio input device, the method comprising,
obtaining, at the first audio input device, a first audio input signal that is based on a first noise masking signals output from a first audio output device of an apparatus, wherein the apparatus includes a housing arranged to receive the personal communication device, the housing supports the first audio output device and includes a first audio-seal, the first audio-seal provides a first audio-sealing pathway between the first audio output device and the first audio input device and covers the first audio input device, and wherein the first audio input signal arrives at the first audio input device via the first audio-sealing pathway;
generating, based on the first audio input signal, a recorded representation of the first audio input signal; and
determining whether or not the first audio-sealing pathway satisfies an operational criterion based on the recorded representation of the first audio input signal and operational characteristics associated with the first audio-sealing pathway.

12. The method of claim 11, wherein the operational characteristics include a lower amplitude boundary and an upper amplitude boundary.

13. The method of claim 12, wherein the recorded representation of the first audio input signal corresponds to a frequency representation of the first audio input signal, and wherein determining whether or not the first audio-sealing pathway satisfies the operational criterion includes determining whether or not the frequency representation of the first audio input signal is between the lower amplitude boundary and the upper amplitude boundary.

14. The method of claim 11, further comprising:
determining that the first audio-sealing pathway satisfies the operational criterion in response to determining that a result of comparing the recorded representation of the first audio input signal against the operational characteristics satisfies a similarity threshold; and determining that the first audio-sealing pathway does not satisfy the operational criterion in response to determining that the result does not satisfy the similarity threshold.

15. The method of claim 11, wherein the personal communication device includes a second audio input device, the method further comprising:
obtaining, at the second audio input device, a second audio input signal that is based on a second noise masking signals output from a second audio output device of the apparatus, wherein the housing supports a second audio output device and includes a second audio-seal, the second audio seal provides a second audio-sealing pathway between the second audio output device and the second audio input device, and wherein the second audio input signal arrives at the second audio input device via the second audio-sealing pathway;
generating, based on the second audio input signal, a recorded representation of the second audio input signal; and
determining whether or not the second audio-sealing pathway satisfies the operational criterion based on the recorded representation of the second audio input signal and operational characteristics associated with the second audio-sealing pathway.

16. The method of claim 15, wherein the first noise signal stream and the second noise signal stream are uncorrelated with respect to each other.

17. An apparatus comprising:
a first audio output device;
a housing arranged to receive a personal communication device, the housing supports the first audio output device and includes a first audio-seal providing a first audio-sealing pathway between the first audio output device and a corresponding first audio input device of the personal communication device and the first audio-seal covers the first audio input device when the apparatus holds the personal communication device;
a noise generator to generate a first noise signal stream; and
a controller to:
output, via the first audio output device, first noise masking signals based on the first noise signal stream towards the corresponding first audio input device of the personal communication device, wherein the first noise masking signals travel from the first audio output device of the personal communication device towards the corresponding first audio input device via a first audio-sealing pathway provided by the first audio-seal;
receive, from an application on the personal communication device, a recorded representation of the first noise masking signals from the personal communication device, wherein the recorded representation of the first noise masking signals is a function of a transformation of the first noise signal stream, by the first audio-sealing pathway, and wherein the transformation characterizes a first audio transfer function of the first audio-sealing pathway; and
determine whether or not the first audio-sealing pathway satisfies an operational criterion based on the recorded representation of the first noise masking signals and a reference transfer function associated with the first audio-sealing pathway.

18. The apparatus of claim 17, wherein the first noise signal stream includes patterns of distinct information, and wherein the controller determines whether or not the first audio-sealing pathway satisfies the operational criterion by determining whether or not the recorded representation of the first noise signal stream includes a representation of the patterns of distinct information.

19. The apparatus of claim 17, wherein the housing includes a second audio-seal, the second audio-seal provides a second audio-seal pathway between a second audio output device of the apparatus and a corresponding second audio input device of the personal communication device and covers the second audio input device;
the noise generator to generate a second noise signal stream; and
the controller to:
output, via the second audio output device, second noise masking signals based on the second noise signal stream towards the corresponding second audio input device of the personal communication device, wherein the second noise masking signals travel from the second audio output device towards the corresponding second audio input device of the personal communication device via the second audio-sealing pathway provided by the second audio-seal;
receive, from the application on the personal communication device, a recorded representation of the second noise masking signals from the personal communication device, wherein the recorded representation of the second noise masking signals is a function of a transformation of the second noise signal stream, by the second audio-sealing pathway, and wherein the transformation characterizes a second audio transfer function of the second audio-sealing pathway; and
determine whether or not the second audio-sealing pathway satisfies the operational criterion based on the recorded representation of the second noise masking signals and a reference transfer function associated with the second audio-sealing pathway.

20. The apparatus of claim 19, wherein the first noise signal stream and the second noise signal stream are uncorrelated with respect to each other.

* * * * *